United States Patent [19]

Srodes

[11] 4,019,172
[45] Apr. 19, 1977

[54] CENTRAL SUPERVISORY AND CONTROL SYSTEM GENERATING 16-BIT OUTPUT

[75] Inventor: Paul G. Srodes, Arlington Heights, Ill.

[73] Assignee: Honeywell Inc., Minneapolis, Minn.

[22] Filed: Jan. 19, 1976

[21] Appl. No.: 650,229

[52] U.S. Cl. ............ 340/146.1 C; 340/146.1 BA; 340/163
[51] Int. Cl.² ...................................... G08B 29/00
[58] Field of Search .......... 340/146.1 BA, 146.1 C, 340/163, 172.5

[56] References Cited
UNITED STATES PATENTS

| | | | |
|---|---|---|---|
| 3,349,374 | 10/1967 | Gabrielson et al. | 340/146.1 C |
| 3,427,585 | 2/1969 | Milford | 340/146.1 BA |
| 3,624,603 | 11/1971 | Delcomyn | 340/146.1 BA |
| 3,697,953 | 10/1972 | Schoenwitz | 340/163 R |
| 3,716,096 | 2/1973 | Berrett et al. | 340/163 |
| 3,732,541 | 5/1973 | Neubauer | 340/146.1 BA |
| 3,772,649 | 11/1973 | Haselwood et al. | 340/146.1 BA |

*Primary Examiner*—Charles E. Atkinson
*Attorney, Agent, or Firm*—Trevor B. Joike

[57] ABSTRACT

A system is disclosed having a central processor for supervising and controlling a plurality of remote stations over a transmission channel wherein the central processor comprises a microprocessor and a 16-bit generating system for supplying in a single word to the microprocessor the data which is received from remote stations, a busy signal indicating that the system in the central processor is busy transmitting data, an error signal indicating that there was an error in transmission from the remote stations, and a no response signal indicating whether or not the remote station, which was addressed by the central processor, transmitted to the central processor a response within a predetermined amount of time.

20 Claims, 11 Drawing Figures

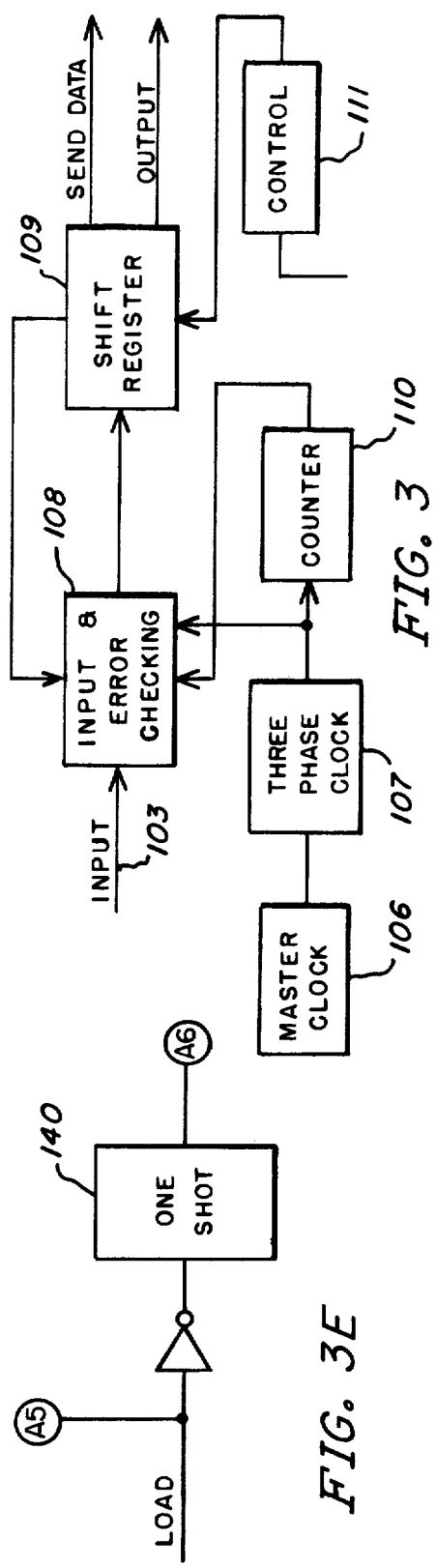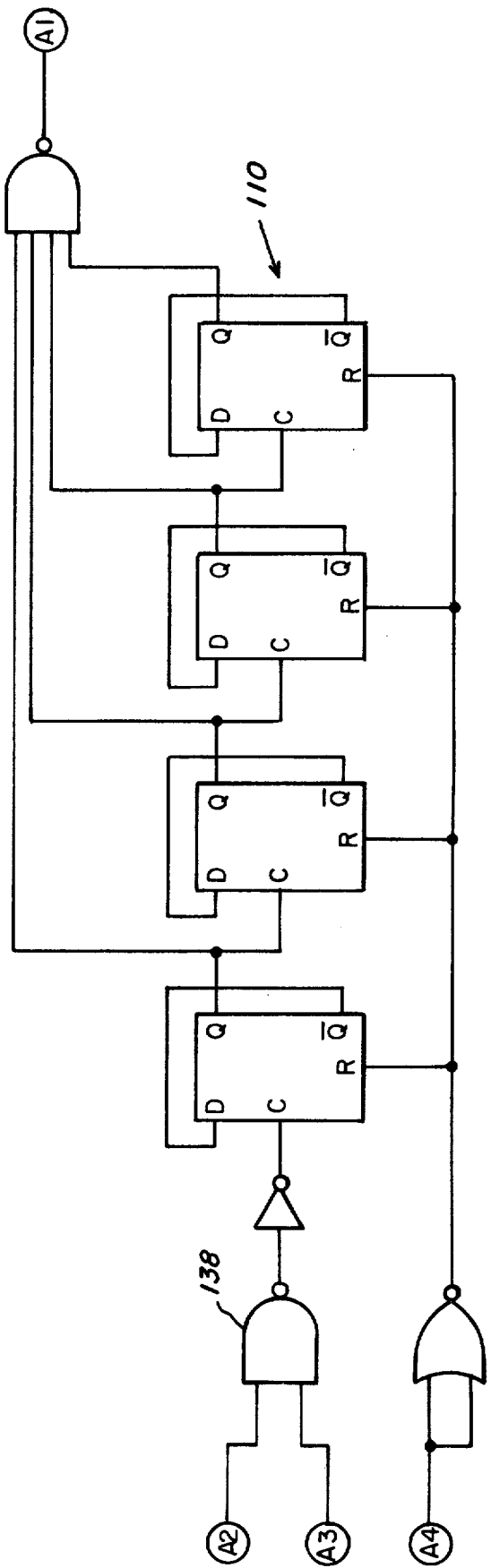

4,019,172

CENTRAL SUPERVISORY AND CONTROL SYSTEM GENERATING 16-BIT OUTPUT

The present invention relates to a control and supervisory system wherein a central processing unit scans and controls various remote stations over a common transmission channel. The present invention is particularly useful in those systems which control the environment within a building and/or monitor fire and security conditions within a building.

Prior art communication systems, for example, controlling the environment within the building or fire and security conditions within the building, having a central panel for providing alarm indications or indications of the status of various points within the building, originally provided a separate wire running from the panel to each point which was being monitored. In today's large buildings, however, the cost of wiring in this manner can be prohibitive. Therefore, the prior art replaced these plurality of wires by a single transmission channel running from the central processing unit to the remote points being monitored.

The central processing unit is capable of scanning the status of the various remote points and controlling various operations at the remote points by addressing in turn, each remote point and requiring the remote points to take some action. The action may be to report back its present status such as temperature, pressure or humidity, or to perform some operation such as starting or stopping a fan, opening a damper, or whatever. By using a single transmission channel, the cost of installation of these monitoring systems is greatly reduced.

As can be seen, these remote points might be temperature or humidity measuring devices, switches for sensing motor or damper operation, fire sensing switches or burglar responsive devices. When the processing units in the prior art systems, which may be comprised of a computer and associated interface equipment, require the status or analog condition of each of the remote points, it would receive back a message from each remote point informing the central processing unit of its status or of its present analog condition. The interface equipment received this information transmitted by the remote points and provided various outputs to the computer.

These outputs to the computer depended upon the capabilities of each particular system. Although the various prior art systems generated outputs to the computer comprising the data received from the remote points, indications of whether or not there had been an error in transmission, whether or not the remote point responded within a predetermined amount of time, and whether or not the associated interface equipment was busy transmitting data, no prior art system supplied all of this information to the computer in one word. As can be seen, by providing this information to the computer in one word, a substantial amount of computer time is saved.

SUMMARY OF THE INVENTION

The present invention comprises a central processing unit for transmitting supervisory and control messages over a single transmission channel to a plurality of remote stations. The remote stations in turn transmit back to the central processing unit information which the central processing unit can use to carry out its functions. The central processing unit comprises a microprocessor and a universal asynchronous receiver transmitting system which system generates a 13-bit output comprising the information transmitted by the remote stations, an error signal indicating whether or not there was an error in transmission, a busy signal indicating whether the universal asynchronous receiver transmitter is busy transmitting information and a no response signal indicating whether or not the remote station has responded within a predetermined amount of time. The microprocessor can receive this word in a single operation for use in performing its functions.

These and other features will become apparent from a review of the drawings in which.

Figure 1:
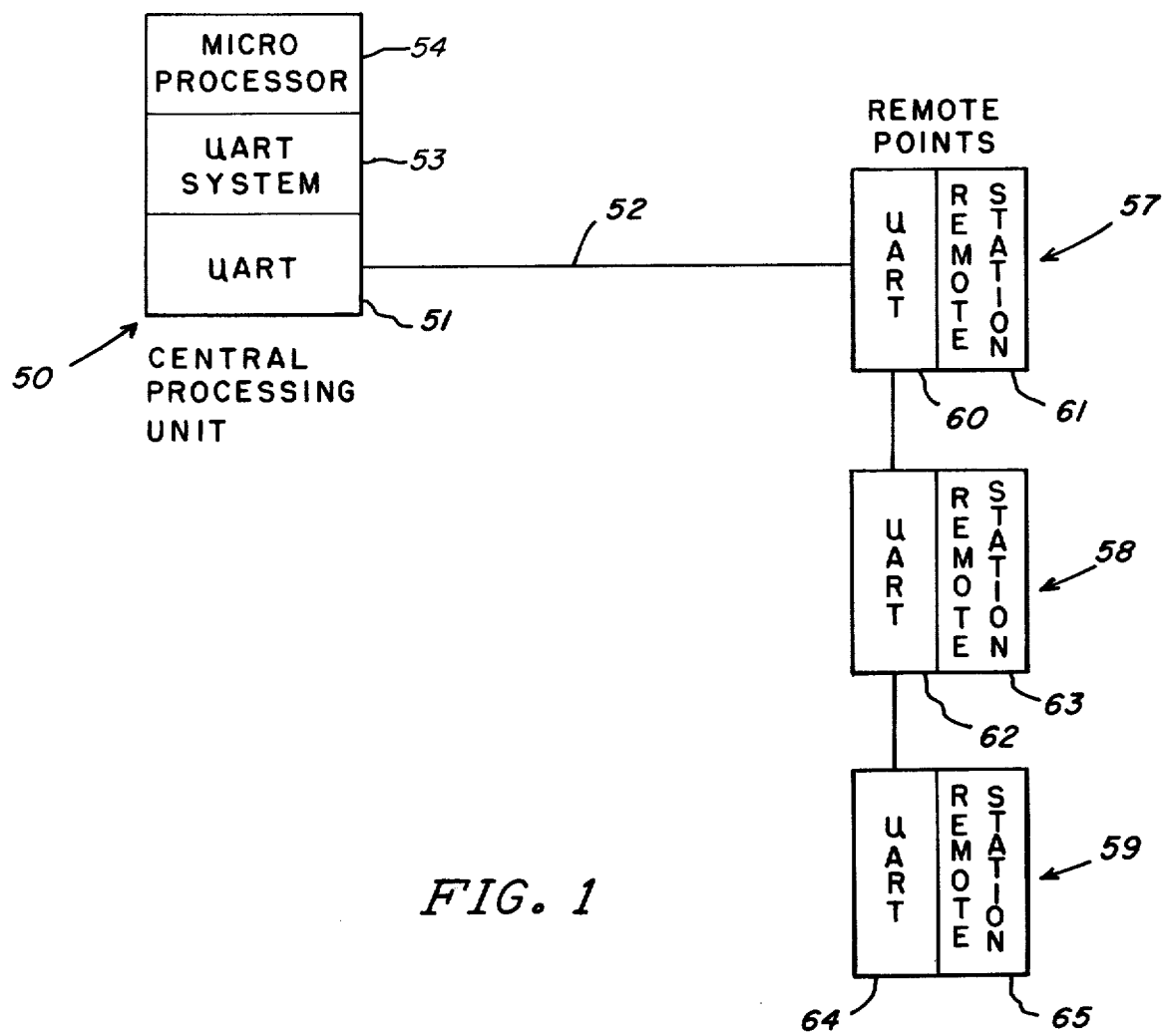
FIG. 1 is a block diagram showing the central processing unit and several remote stations.

The general communication system is shown in FIG. 1 and comprises the central processing unit 50 having a universal asynchronous receiver transmitter (UART) 51 connected to a transmission channel 52. Also connected to the UART, by suitable interconnection means not shown, is apparatus 53 which, together with the UART 51, forms the universal asynchronous receiver transmitter system. The system utilizes the outputs from the UART to supply a 16-bit buss to the microprocessor 54 with the data received from the remote stations, and the error, no response, and busy signals generated by the UART. The microprocessor may be the National Semiconductor, Inc. IMP 16.

At the other end of the transmission line 52 are a plurality of remote points, 57, 58, and 59. The remote point 57 comprises a UART, which may be the same as the UART 51 of the central processor 50, and a remote station 61. The remote point 58 comprises a UART 62 and remote station 63 and the remote point 59 comprises a UART 64 and a remote station 65.

These remote stations may comprise status switches for providing information to the central processor of the opening or closing of burglar detector devices or fire alarm switches or switches indicating whether dampers are open or closed, or whether motors are on or off. The remote stations may also comprise analog devices for providing an indication of temperature, humidity, and so on to the central processing unit.

Figure 2:
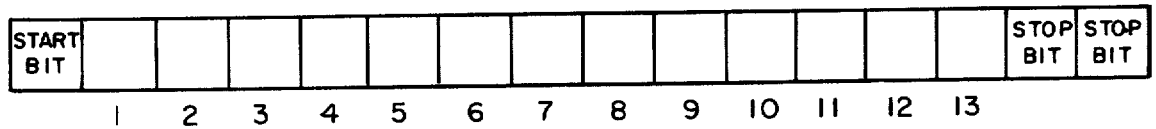
FIG. 2 shows a typical word which is transmitted and received from and by the central processing unit and the remote stations.

The central processing unit and remote points may communicate with each other by the use of 13-bit words, plus a start bit and a stop bit, such as that shown in FIG. 2. The above noted applications may be referred to for an example of the way in which the word shown in FIG. 2 may be utilized by the central processor and the remote points to communicate with one another.

The UART 51 and the UARTs 60, 62, and 64 are shown in more detail in FIGS. 3–3E. Only one such UART is shown in detail since all four may be identical. Each message transmitted by a remote station or the central processor is transmitted twice, once during the first half of the transmission and a second time during the second half of the transmission. FIG. 3 shows a generalized block diagram for the universal asynchronous receiver transmitters shown in FIG. 1. The UART is driven by master clock 106 which drives the various clock generators for providing the timing signals necessary for operating the UART. The output from master clock 106 drives three phase clock 107 which produces three outputs for generating timing signals for the rest of the circuit. The input data received over transmission line 52 is fed through input and error checking circuit 108 and stored in shift register 109 under the control of the three phase clock and is shifted out of the shift register back into input and error checking circuit 108 which checks the first half of the transmission of the message on line 52 with the second half of the transmission, bit by bit. The error checking is accomplished under the control of counter 110 which counts the number of bits within a message for controlling the error checking done by circuit 108. When the error checking operation is completed, the message is then provided at the output of the shift register. The output actually comprises a plurality of lines. Any message provided by a load or control 111, which may be a remote station in the form of a printer control, security of fire monitoring station or environmental control station, can provide an input to the shift register 109 for sending data back out over the transmission channel 52 to the central processing unit.

The specific apparatus within the general boxes is shown in more detail in FIGS. 3A–3E. The terminals A0–A9 and B0–B4 show how these circuits are interconnected.

Figure 3A:
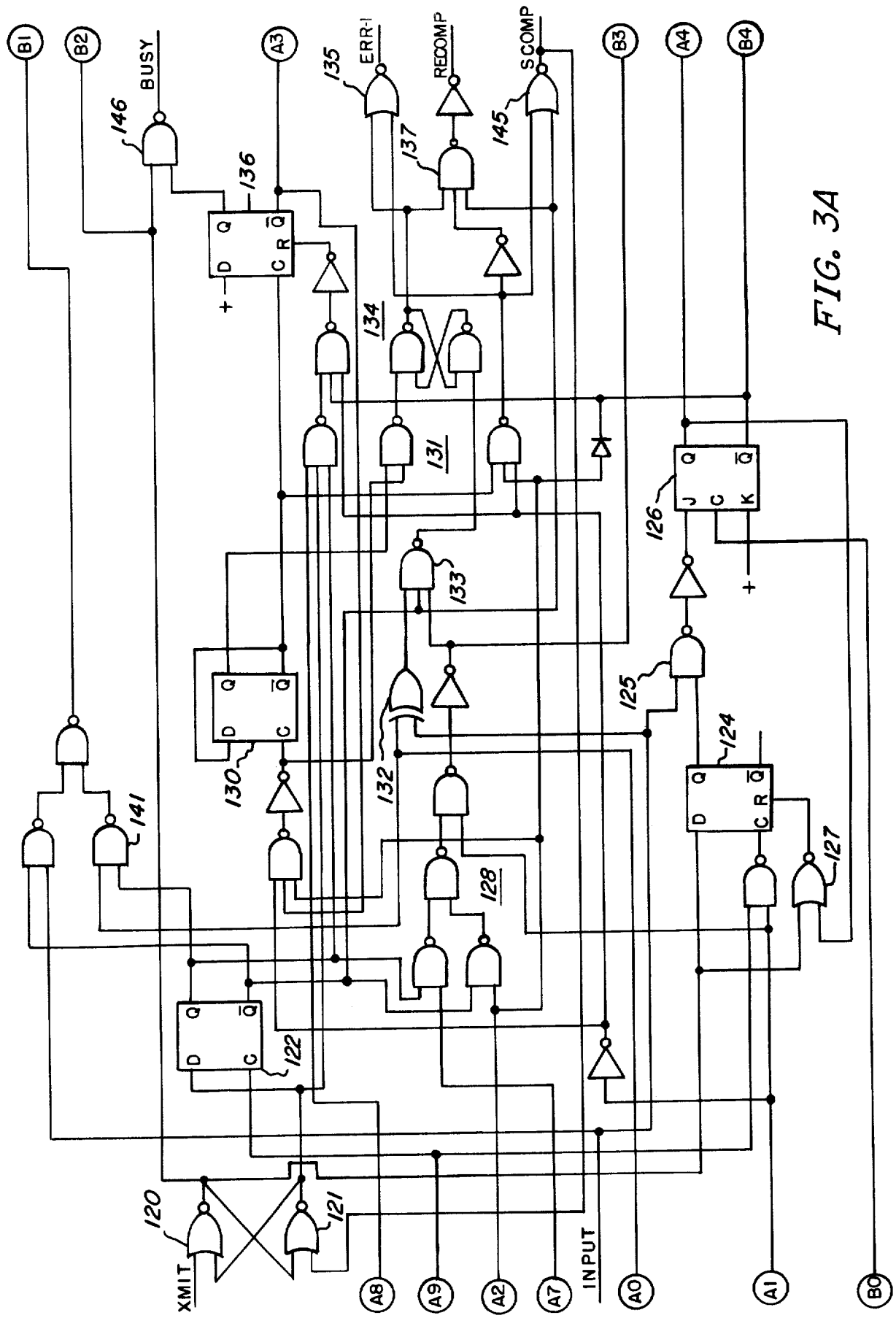
FIGS. 3–3E show the universal asynchronous receiver transmitter (UART) at the central processor and each of the remote stations; and, FIGS. 4–6 show the associated circuitry which, together with the UART shown in FIGS. 3–3E, form the universal asynchronous receiver transmitter system.
Figures 3B, 3C:
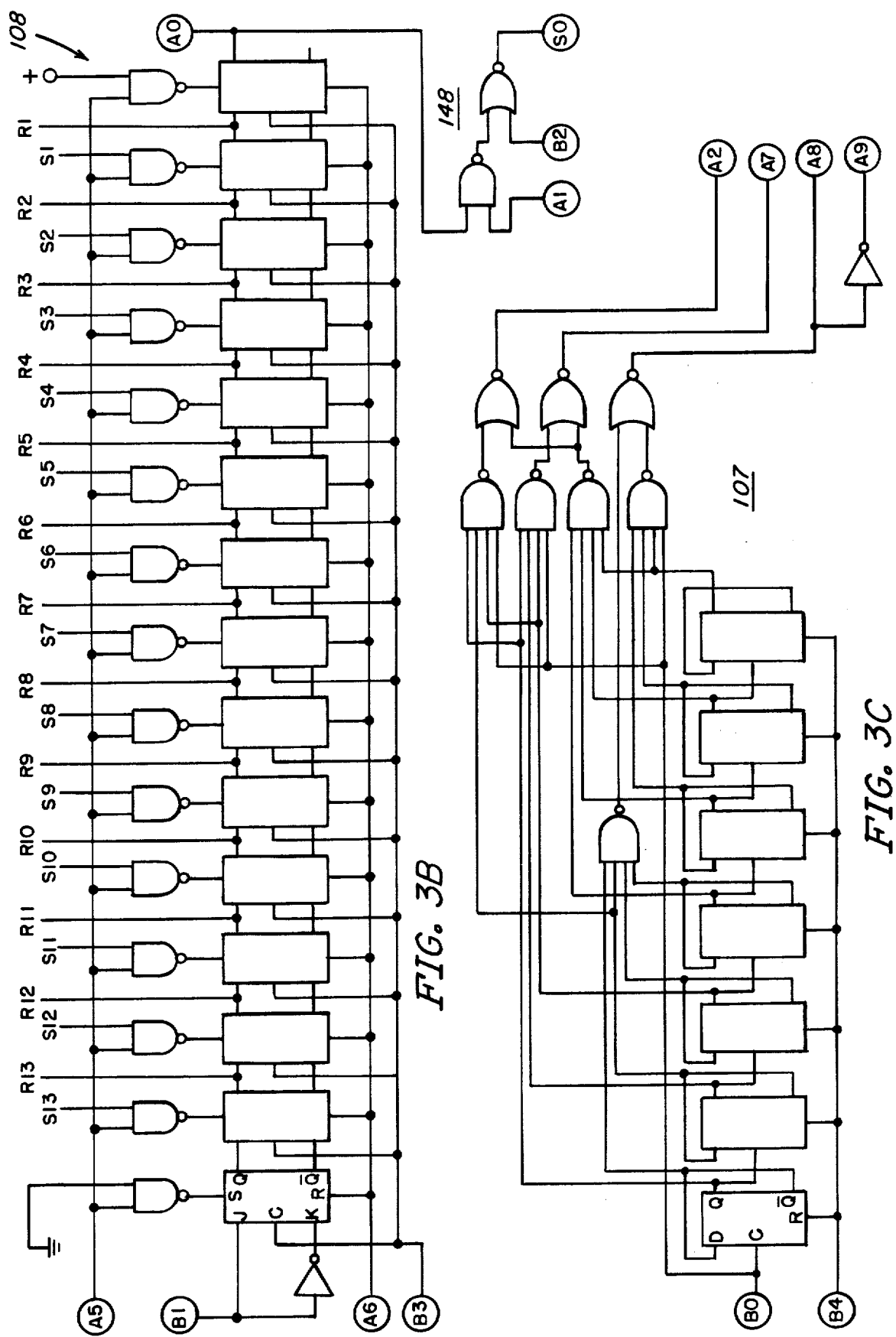

During standby conditions, when the UART is in a condition to receive input data over the transmission line, transmit flip-flop 120–121 in FIG. 3A is in a condition where the output from NOR gate 120 is 1 and the output from NOR gate 121 is 0. The mode flip-flop 122 is reset to allow any incoming data to pass through NAND gate 123 to terminal B1 for shifting through the shift register shown in FIG. 3B.

The master clock 106 provides an input at terminal B0 to the three phase clock 107 which produces its output at terminals A2, A7, A8, and A9 for controlling the timing of the circuit of FIG. 3A and for driving the count of 15 counter 110 of FIG. 3D. Moreover, the 0 output from NOR gate 120 is clocked by D flip-flop 124 to the input of NAND gate 125.

Upon receipt of the first message over the transmission line, the first message is received on the input terminal of the circuit shown in FIG. 3A and the start bit of the message is transmitted through NAND gate 125 to the J terminal of J flip-flop 126 which is clocked by the output from the master clock 106. The outputs from the J flip-flop 126 are presented on terminals A4 and B4 for resetting the count of 15 counter 110 and the three phase clock 107. The Q output from flip-flop 126 is also connected through NOR gate 127 to reset the D flip-flop 124 to prevent any further bits from being transmitted through the NAND gate 125.

The incoming message is also supplied to the NAND gate 123 and is transmitted therethrough to terminal B1 for storing in the shift register 108. The input data word is shifted through the shift register 108 under the control of logic circuitry 128 which provides an output at terminal B3 dependent upon the three phase clock 107 which has inputs to the logic circuitry 128 at terminals A2 and A7.

As the incoming message is shifted through shift register 108, the count of 15 counter 110 is, in effect, counting the bits of the message and when a count of 15 is reached it produces an output on terminal A1 which clocks the 0 from NOR gate 120 through D flip-flop 124 to condition NAND gate 125 to receive another message on the input, momentarily inhibits logic circuitry 128 from supplying any further pulses to the clock terminals of shift register 108 and operates the half cycle flip-flop 130 to reverse its Q and $\overline{Q}$ outputs. When the half cycle flip-flop 130 operates, it conditions logic circuitry 131 to provide the ERR-1 (error), RECOMP (receive complete), and/or SCOMP (send complete) signals upon the completion of the error checking cycle.

The error checking cycle is begun as the count of 15 counter 110 begins its next count of 15. The information which was stored in the shift register 108 is clocked out under the control of logic circuitry 128 and presented at terminal AO to comparator EXCLUSIVE OR gate 132. The other side of the EXCLUSIVE OR gate receives the second half of the transmission from the input line and compares the second half of the transmission with the first half of the transmission stored in shift register 108 bit by bit. At the same time, the second half of the transmission is supplied through NAND gate 123 and shifted into the shift register 108 as the first half of the transmission is shifted out. If there is an error in transmission, i.e. a bit of the first half of the transmission and a corresponding bit of the second half of the transmission do not match, gate 132 provides an output through NAND gate 133 to Error Latch 134 to provide an error output through NOR gate 135. Assuming, however, that there is no error in transmission, the second count of 15 output from count of 15 counter 110 operates flip-flop 130 to provide a clock signal to stop flip-flop 136 and to operate logic circuitry 131 to provide an output to NAND gate 137 which produces a receive complete signal. When the stop flip-flop 136 operates, it provides an output to the NAND gate 138 of the count of 15 counter 110 to inhibit any further clocking signals from the three phase clock at terminal A2. Thus the output terminal A1 is maintained at a state which prohibits the logic circuitry 128 from producing any further clocking signal to the shift register 108. The message which was transmitted is stored in shift register 108 and appears at terminals R1–R13 as an output from the UART. The error signal from NOR gate 135 also provides an output from the UART as does the receive complete line. The UART is now in a condition to receive any further messages transmitted to its input.

If the remote station or central processing unit associated with the UART has any information to transmit, the remote station or central processing unit provides both a transmit pulse to NOR gate 120 and a load pulse to the input of the circuit shown in FIG. 3E. The load pulse triggers a one shot circuit 140 which provides an output to terminal A6 which clears the shift register 108 and also produces an output at terminal A5 which loads in the message to be transmitted appearing on terminals S1–S13 of the shift register 108 through associated NAND gates. When NOR gates 120 and 121 reverse their outputs, the 0 at the output from NOR gate 120 is clocked through D flip-flop 124 and J-K flip-flop 126 to reset the count of 15 counter 110 and the three phase clock. Also, mode flip-flop 122 is operated to condition NAND gate 141 to shift the message in shift register 108 back into the register 108 while it is being shifted out on the transmission line. As the logic circuitry 128 is providing the clocking pulses to the shift register 108, the message stored in register 108 is shifted out at terminal A0 and is also shifted out through send logic circuitry 142 which has been conditioned to transmit the bits at terminal A0 by an input from terminal B2 which is connected to the output at NOR gate 120. The message shifted through the logic circuitry 142 is supplied to the transmission line and is also supplied to terminal A0 of FIG. 3A which is connected through NAND gate 141 to the input of the shift register. As the first half ot the transmission is completed, the count of 15 counter 110 provides an output which triggers half mode flip-flop 130 to condition stop flip-flop 136 to stop the transmission after the second half of the transmission. As the message is clocked out on the line a second time, the count of 15 counter 110 will provide an output at the end of the second half of the transmission which prevents logic circuitry 128 from providing any more clocking signals to the shift register 108. The count of 15 counter ceases operation due to the output from stop flip-flop 136 on terminal A3 which inhibits any further three phase clock pulses from being supplied to the clocking terminal of count of 15 counter 110. At the same time, an input is supplied to NOR gate 145 which provides a send complete signal and which also resets the transmit latch 120–121.

When originally latch 120–121 is set indicating that the UART is in a transmitting mode, an output is supplied through NAND gate 146 which is a busy signal to inform the central processing unit or the remote station that the UART is busy transmitting data. The output from NOR gate 145 resets the transmit latch 120–121 and the UART is now in a condition to either transmit or receive messages.

Figure 4:
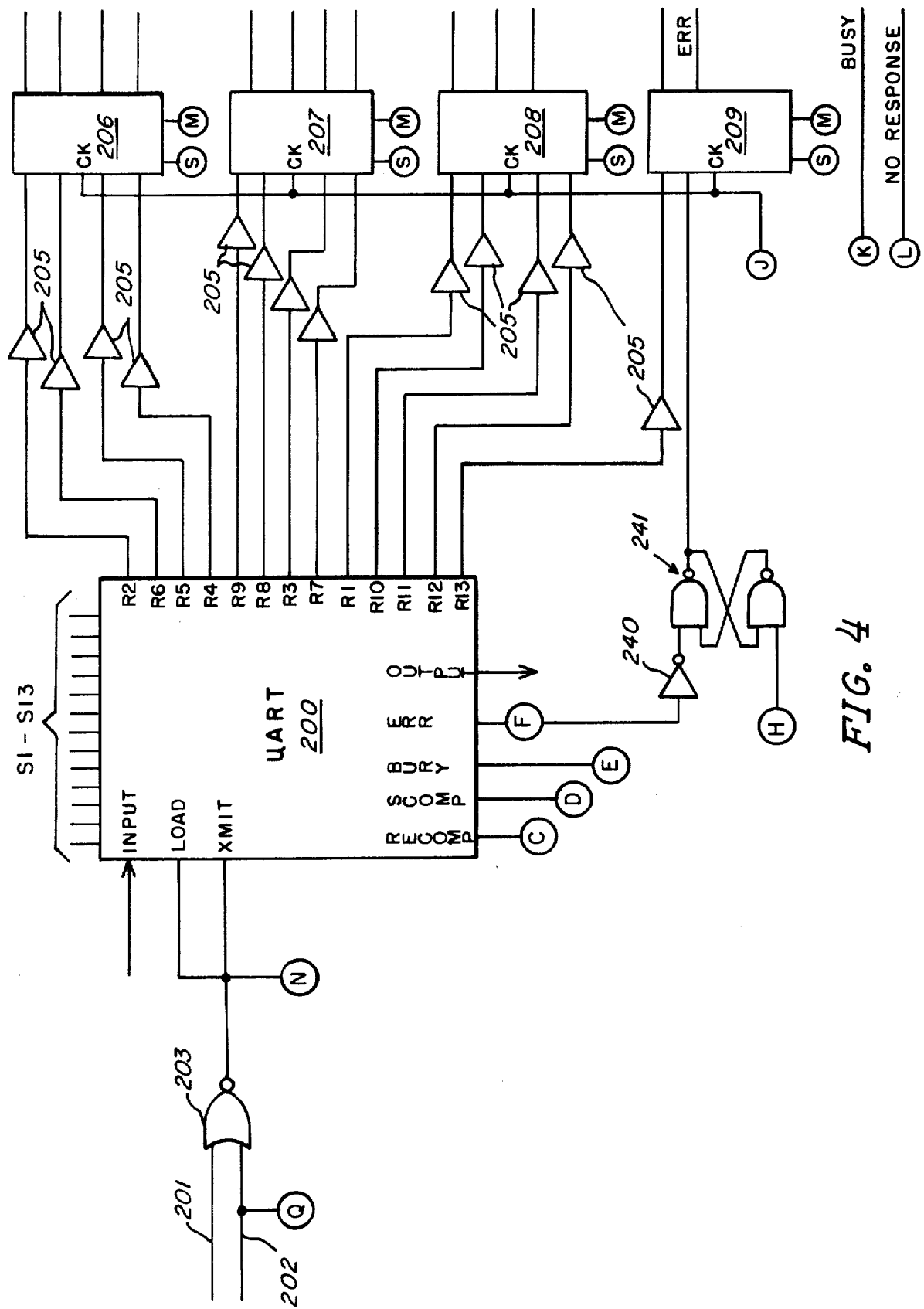

The UART is shown in FIG. 4 in more simplified form to show how it is associated with the rest of the circuitry to form the UART system 53 of FIG. 1. The UART 200 has 13 inputs, S1–S13, for loading into the serial register shown in FIG. 3B the data which is to be transmitted by the central processing unit. The microprocessor provides inputs at terminals 201 and 202 through a NOR gate 203 which provides the transmit and load pulses to the UART for loading the information at terminals S1–S13 into the shift register and for transmitting the data from the shift register out on the transmission line. The transmission line 52 is shown connected to the input terminal of the UART 200 but, as can be recognized, interface apparatus may have to be provided for connecting the transmission channel 52 to the UART.

As discussed in association with FIGS. 3–3E, the information received from the remote stations comes in on transmission channel 52 and appears on the outputs R1–R13. The UART also generates the error, busy, send complete, and receive complete signals at terminals F, E, D, and C, respectively. The outputs R1–R13 are supplied through respective level shifters 205 to the inputs of four latches 206, 207, 208, and 209.

At the same time, the error signal generated by the UART at terminal F is connected through an inverter 240 (FIG. 4) to a latch 241 which provides the error signal to the input of latch 209.

Figure 5:
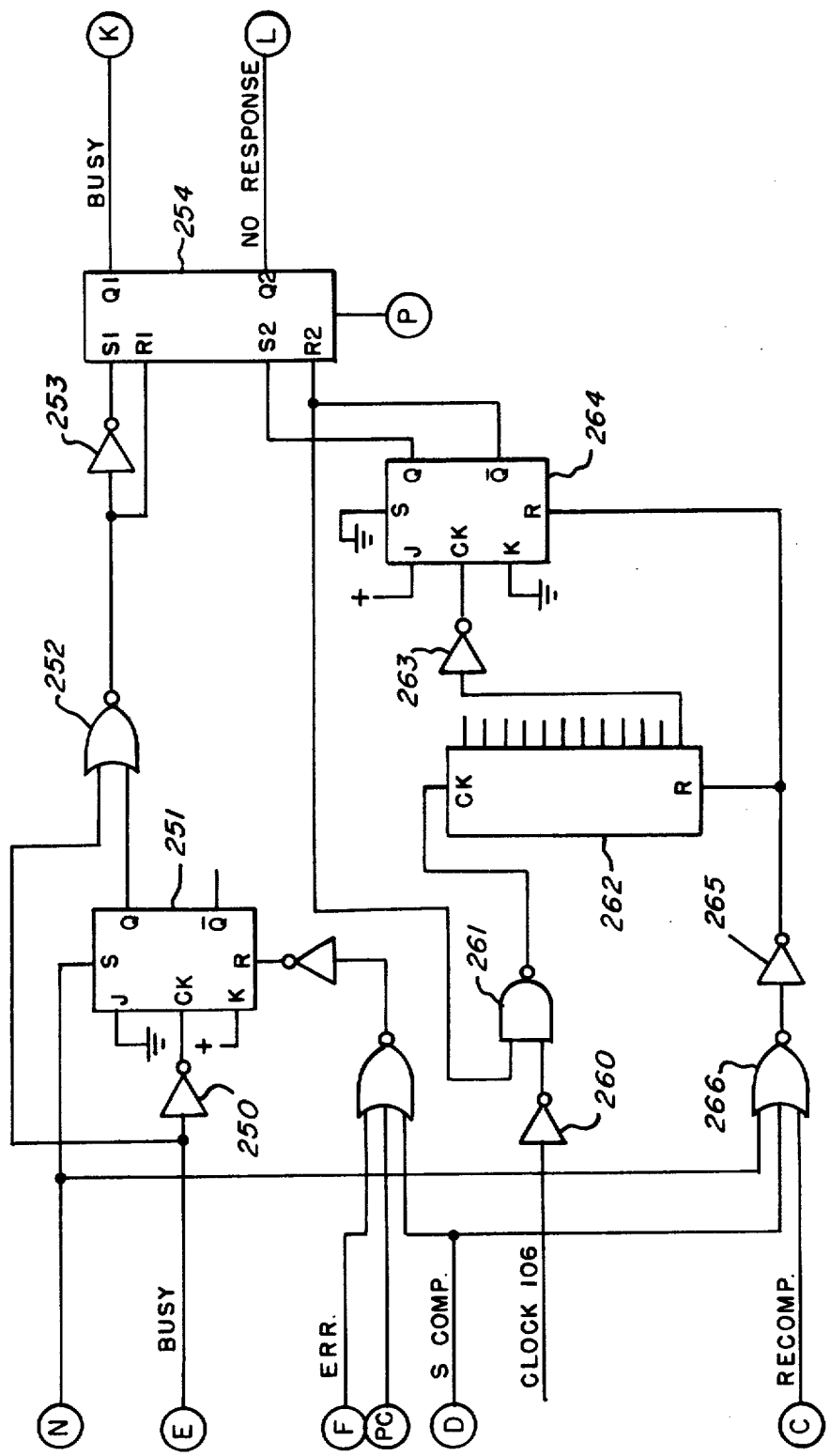

The busy signal at terminal E is connected through an inverter 250 in FIG. 5 to the clock terminal of J-K flip-flop 251 for providing an output at its Q terminal to one input of NOR gate 252. The other input of NOR gate 252 is connected directly to terminal E. This busy signal is then connected through an inverter 253 to the set terminal and connected directly to the reset terminal of a latch of a two-latch circuit 254.

The transmission clock 106 which is driving the UART also provides an input in FIG. 5 through an inverter 260 to NAND gate 261 for providing a clock signal to no response timer 262. The no response timer counts the clock signals and, when a predetermined count is attained, provides an output through an inverter 263 to the clock terminal of J-K flip-flop 264. The reset terminal of the counter 262 is connected from an inverter 265 having an input connected to the output of NOR gate 266. The NOR gate combines the signals at terminal N, the send complete signal at terminal D and the receive complete signal at terminal C for resetting the counter 262 whenever the message has been received by the remote station or the CPU transmits a message to the remote station.

When the central processing unit sends out a message requiring a remote station to provide a response, the load and transmit signal at terminal N and the send complete signal, indicating that the message has been sent out at terminal D, are connected to NOR gate 266 to reset counter 262 and to allow counter 262 to begin counting. Assuming that the remote station transmits back its information within the prescribed period of time, the receive complete signal at terminal C is generated and passes through NOR gate 266 and inverter 265 to reset counter 262. If the prescribed time has not been reached, J-K flip-flop 264 will not be clocked and the Q and $\overline{Q}$ outputs J-K flip-flop 264 will maintain their present levels. If, however, a response from the remote station has not been received within the prescribed period of time, the counter 262 will time out before it receives its reset signal to provide a clock signal to J-K flip-flop 264 which causes the Q and $\overline{Q}$ terminals, which are connected to the S2 and R2 terminals of latch 254, to change states to thus provide the no response signal.

When a word has been received by the UART as indicated by the receive complete signal at terminal C or an error signal at terminal F, NOR gate 224, which has inputs C and F, conditions the K input of J-K flip-flop 222 through inverter 223 and NOR gate 221 to switch when the first clock signal on terminal 212 is received; thereby, generating a signal at terminal J for latching in the information, i.e. the R1–R12 bits and the error signal presented to latches 206–209. The error signal also sets latch 241 through invertor 240. The latch 241 is subsequently reset by the output at terminal H which has a corresponding terminal in FIG. 6 derived from a NAND gate 270 having one input connected to the inverted Q terminal of J-K flip-flop 222 and a second input connected to the output of invertor 230 which has an input connected to the clock signal derived from the microprocessor.

The microprocessor may then read the R bit outputs, error output, busy output and no response output in one operation for its own use. To do this, the microprocessor provides inputs at the 210 and Q terminals as well as a clock input on terminal 212. The output from NOR gate 211 provides a signal at terminal P which enables the latch 254 of FIG. 5 to provide the busy output to terminal K and the no response output to terminal L. The signal at terminal P also propogates through a level shifter and inverter to provide a signal at terminal S which enables the latches 206–209 to output the bits R1–R13 and the error signal ERR.

The output at terminal P also primes J-K flip-flop 215 so that the first clock signal on line 212 will cause J-K flip-flop 215 to set. The next clock signal on line 212 switches J-K flip-flop 216 to provide a clear signal at terminal M for clearing latches 206–209 and also resets flip-flop 215. The next clock signal at line 212 will cause flip-flop 216 to reset.

Figure 6:
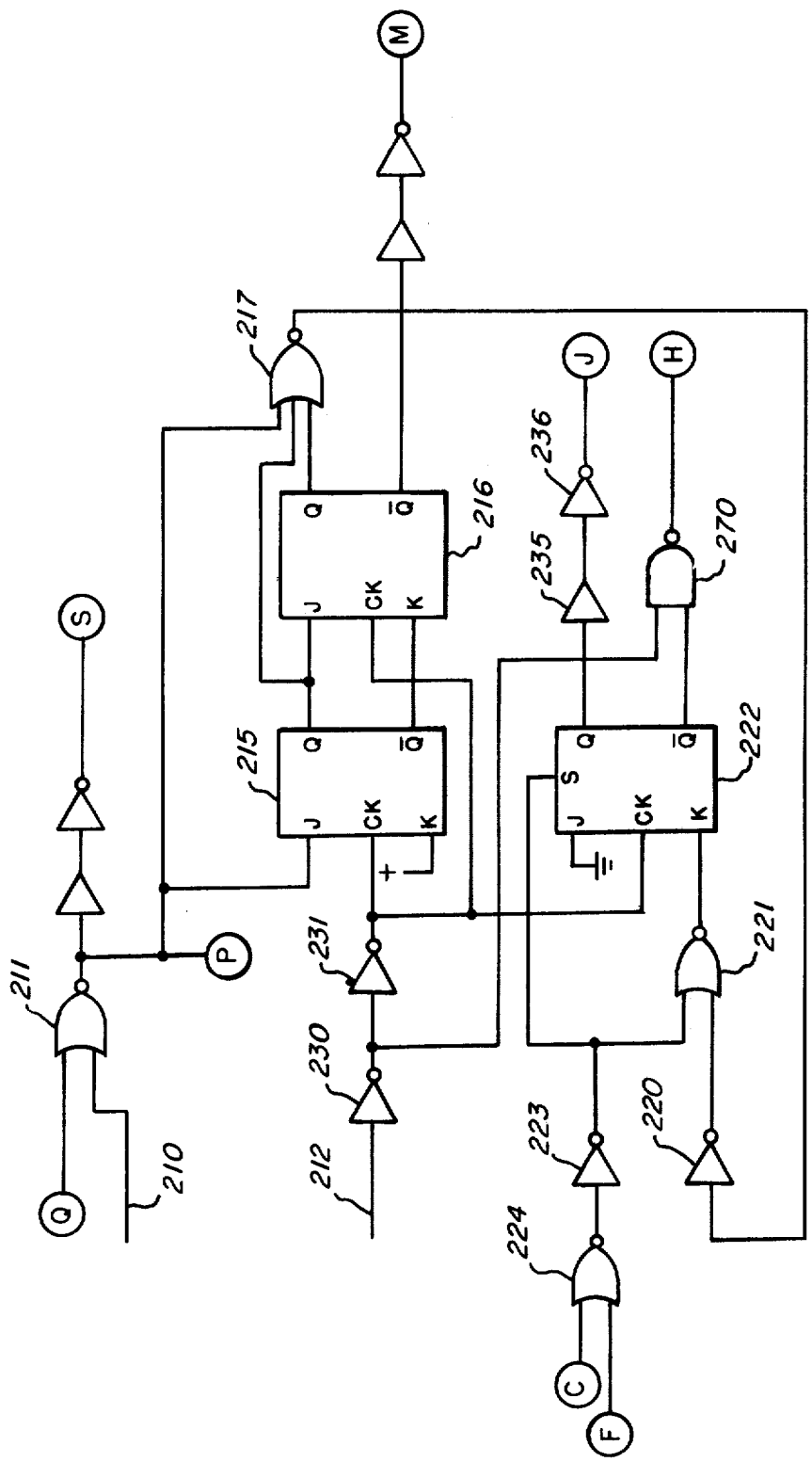

Thus, the system shown in FIGS. 4–6 is in a condition to begin a second operation.

The embodiments of the invention in which an exclusive property or right is claimed are defined as follows:

1. A communication system wherein a central processing means and a plurality of remote stations transmit and receive messages to and from each other over a common transmission channel, said messages constructed of a plurality of bits, said system comprising:
   central processing means having processing means and universal asynchronous receiver transmitter means comprising,
      bit means for generating a plurality of bit signals each corresponding to a bit of a message received from said plurality of remote stations,
      error means for generating an error signal having a state dependent upon whether there is an error in the transmission of messages from said plurality of remote stations, and
      busy means for generating a busy signal having a state dependent upon whether the universal asynchronous receiver transmitter means is busy;
   said central processing means further comprising,
      bit output means connected to receive such bit signals for generating bit outputs,
      error output means connected to receive said error signal for generating an error output,
      busy output means connected to receive said busy signal for generating a busy output, and
      no response means responsive to said messages from said remote states for generating a no response signal having a state dependent upon whether or not a message is received from a remote station within a predetermined time;
   said processing means for receiving substantially simultaneously said bit outputs, error output, busy output and no response output for reading said outputs in one operation;
   transmission channel means connected to said central processing means; and
   a plurality of remote stations each connected to said transmission channel means for receiving and transmitting messages.

2. The system of claim 1 wherein said bit output means comprises a plurality of latches for receiving said bit signals and for generating said bit outputs.

3. The system of claim 2 wherein said bit means comprises a serial shift register for receiving said messages and clock means for shifting said bits in said message through said serial shift register, said serial shift register having a plurality of outputs for providing said bit signals.

4. The system of claim 3 wherein said error output means comprises a latch for receiving said error signal and for generating said error output.

5. The system of claim 4 wherein each transmission of a message comprises a first half and a second half and wherein said error means comprises comparator means for comparing the first half of said transmission to said second half of said transmission bit by bit and generating said error signal having a state dependent upon whether corresponding bits of said first half and said second half of said transmission fail to match.

6. The system of claim 5 wherein said busy output means comprises a latch for receiving said busy signal and for generating said busy output.

7. The system of claim 6 wherein said busy means comprises a transmit flip-flop for generating said busy signal when said universal asynchronous receiver transmitter means is busy transmitting messages.

8. The system of claim 7 wherein said universal asynchronous receiver transmitter means further comprises send complete means for generating a send complete signal when said universal asynchronous receiver transmitter means has completed transmitting messages, receive complete means for generating a receive complete signal when said universal asynchronous receiver transmitter means has completed receiving messages, and said no response means comprises timer latch means responsive to said send complete and receive complete signals for generating said no response signal having a state dependent upon whether or not a message is received from a remote station within a predetermined time.

9. The system of claim 8 wherein said universal asynchronous receiver transmitter means further comprises means responsive to said processing means for substantially simultaneously enabling said latches of said bit output means, error output means, busy output means and said timer latch means for simultaneously generating said bit outputs, error outputs, busy outputs, and no response outputs.

10. A communication system wherein a central processing means and a plurality of remote stations transmit and receive messages to and from each other over a common transmission channel, said messages constructed of a plurality of bits, said system comprising:
   a plurality of remote stations for generating messages containing bits of information in response to messages transmitted by said central processing means;
   transmission channel means connected to said plurality of remote station means for conducting said messages; and,
   central processing means comprising processing means and universal asynchronous receiver transmitter system means connected to said transmission channel means for receiving said messages containing bits of information and for substantially simultaneously generating bit outputs representing said information, an error output having a state dependent upon whether an error in transmission has occurred, a busy output having a state dependent upon whether the universal asynchronous receiver transmitter system means is busy and a no response output having a state dependent upon whether or not a message is received from a remote station within a predetermined time, said outputs for use by said processing means.

11. The system of claim 10 wherein said universal asynchronous receiver transmitter system means comprises a shift register for receiving said messages comprising said bits of information, clock means for shifting said bits through said shift register and a plurality of outputs for providing said bit outputs.

12. The system of claim 11 wherein said messages containing bits of information are transmitted in first and second halves of a transmission, and wherein said universal asynchronous receiver transmitter system means comprises comparator means for comparing said first half of said transmission to said second half of said transmission, bit by bit, and providing said error output having a state dependent upon whether two corresponding bits in said first and second halves of said transmission fail to match.

13. The system of claim 12 wherein said universal asynchronous receiver transmitter means comprises means for shifting said first half of said transmission into said shift register and for shifting said first half of said transmission out of said shift register to said comparator, and for simultaneously presenting said second half of said transmission to said comparator and for shifting said second half of said transmission into said shift register.

14. The system of claim 12 wherein said universal asynchronous receiver transmitter means comprises transmit flip-flop means for generating said busy output having a state dependent upon whether said universal asynchronous receiver transmitter system means is busy transmitting messages.

15. A communication system wherein a central processing means and a plurality of remote stations transmit and receive messages to and from each other over a common transmission channel, said messages constructed of a plurality of bits, and wherein said messages are transmitted once during a first half of a transmission and a second time during a second half of said transmission by said central processing means and said plurality of remote stations for error checking, a universal asynchronous receiver transmitter for each said central processing means and said plurality of remote stations comprising:

shift register means for storing said messages received or to be transmitted over said transmission channels;

clock and mode control means for determining whether said universal asynchronous receiver transmitter is in a transmitting mode or a receiving mode for shifting said message during said first half of said transmission and then said message during said second half of said transmission through said shift register during said receiving mode and for shifting said message onto said transmission channel during said first half of said transmission and back into said shift register for said second half of said transmission during said transmitting mode; and, error checking means responsive to said clock and mode control means during said receiving mode for receiving said message received by said shift register during said first half of said transmission out of said shift register and said message during said second half of said transmission as it is being shifted into said shift register means and for comparing bit by bit said first half of said transmission to said second half of said transmission for producing an error signal having a state dependent upon whether any two corresponding bits fail to match.

16. The system of claim 15 wherein said clock and mode control means comprises a three phase clock driven by a master clock and connected to said shift register means for shifting said bits into and out of said shift register means and a count of 15 counter for generating first and second count of 15 signals and means responsive to said second count of 15 signals for terminating said transmitting and receiving modes.

17. The system of claim 16 wherein said clock and mode control means comprises transmit flip-flop means responsive to a transmit signal for resetting said three phase clock and said count of 15 counter to initiate said transmitting mode and said receiving mode and for generating a busy signal during said transmitting mode.

18. The system of claim 17 wherein said shift register means comprises outputs for presenting said bits of said messages received during said receiving mode, and inputs and load means for loading into said shift register bits of said messages to be transmitted during said transmitting mode.

19. The system of claim 18 wherein said clock and mode control means comprises means for generating a receive complete signal at said second count of 15 from said count of 15 counter at the end of said receiving mode if no error between said first and second halves of said transmissions has occurred.

20. The system of claim 19 wherein said clock and mode control means comprises means for generating a send complete signal at said second count of 15 from said count of 15 counter at the end of said transmitting mode.

* * * * *